United States Patent
Huang et al.

(10) Patent No.: US 9,444,353 B2
(45) Date of Patent: Sep. 13, 2016

(54) ISOLATED POWER CONVERTER AND ASSOCIATED SWITCHING POWER SUPPLY

(71) Applicant: Silergy Semiconductor Technology (Hangzhou) LTD, Hangzhou, ZheJiang Province (CN)

(72) Inventors: Qiukai Huang, ZheJiang Province (CN); Jian Deng, ZheJiang Province (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/661,879

(22) Filed: Mar. 18, 2015

(65) Prior Publication Data

US 2015/0280578 A1    Oct. 1, 2015

(30) Foreign Application Priority Data

Mar. 28, 2014  (CN) .......................... 2014 1 0122598

(51) Int. Cl.
*H02M 3/335* (2006.01)
*H02M 1/32* (2007.01)

(52) U.S. Cl.
CPC ........... *H02M 3/33507* (2013.01); *H02M 1/32* (2013.01)

(58) Field of Classification Search
USPC ....... 363/16, 20, 21.01, 21.02, 21.04, 21.07, 363/21.08–21.018, 56.05, 56.08, 56.11, 40, 363/44, 56.12, 95, 98; 307/45, 51; 323/282, 323/283, 284, 285, 266
See application file for complete search history.

(56) References Cited

U.S. PATENT DOCUMENTS

| | | | | |
|---|---|---|---|---|
| 4,129,788 A * | 12/1978 | Chavannes | | 307/11 |
| 6,888,108 B2 * | 5/2005 | Carr | | 219/483 |
| 7,193,872 B2 * | 3/2007 | Siri | | 363/95 |
| 7,324,361 B2 * | 1/2008 | Siri | | 363/95 |
| 7,701,736 B2 | 4/2010 | Yang et al. | | |
| 7,903,436 B2 | 3/2011 | Strijker | | |
| 8,242,765 B2 * | 8/2012 | Kunimatsu | | 323/285 |
| 2008/0198525 A1 | 8/2008 | Janssen | | |
| 2013/0063985 A1 | 3/2013 | Ye et al. | | |
| 2014/0268901 A1* | 9/2014 | Telefus | | 363/21.01 |

FOREIGN PATENT DOCUMENTS

| CN | 101843042 A | 12/2012 |
|---|---|---|
| CN | 202634284 A | 12/2012 |
| CN | 102882359 A | 1/2013 |
| CN | 202856607 A | 4/2013 |

* cited by examiner

*Primary Examiner* — Adolf Berhane
*Assistant Examiner* — Nusrat Quddus
(74) *Attorney, Agent, or Firm* — Michael C. Stephens, Jr.

(57) ABSTRACT

In one embodiment, an isolated power converter can include: (i) a transformer having a primary winding and a secondary winding; (ii) a secondary rectifier circuit coupled to the secondary winding; (iii) a power switch coupled between an input voltage source and a first terminal of the primary winding, where a second terminal of the primary winding is coupled to ground; (iv) a feedback circuit coupled between the first and second terminals of the primary winding, the feedback circuit being configured to generate a feedback voltage based on a voltage across the primary winding; (v) a control circuit configured to generate a control signal to control the power switch; and (vi) an over voltage protection circuit configured to activate a reset signal when the voltage feedback signal is greater than a threshold value, where the reset signal is configured to reset the control signal when activated.

10 Claims, 8 Drawing Sheets

ISOLATED POWER CONVERTER AND ASSOCIATED SWITCHING POWER SUPPLY

RELATED APPLICATIONS

This application claims the benefit of Chinese Patent Application No. 201410122598.1, filed on Mar. 28, 2014, which is incorporated herein by reference in its entirety.

FIELD OF THE INVENTION

The present invention generally relates to the field of power electronics, and more specifically to an isolated power converter without any auxiliary windings, and an associated switching power supply.

BACKGROUND

Isolated power converters are widely used in various kinds of off-line power supply systems. An isolated power converter typically includes a primary-side circuit and a secondary-side circuit, which outputs a substantially constant voltage or current in the secondary-side circuit by controlling a power switch in the primary-side circuit. In order to avoid damage on the circuit due to over voltage conditions, it can be determined if an output voltage is in an over voltage condition according to feedback values, and that can be used to protect the isolated power converter in such a case. Some isolated converters obtain feedback values by employing an auxiliary winding in the transformer.

SUMMARY

In one embodiment, an isolated power converter can include: (i) a transformer having a primary winding and a secondary winding; (ii) a secondary rectifier circuit coupled to the secondary winding; (iii) a power switch coupled between an input voltage source and a first terminal of the primary winding, where a second terminal of the primary winding is coupled to ground; (iv) a feedback circuit coupled between the first and second terminals of the primary winding, the feedback circuit being configured to generate a feedback voltage based on a voltage across the primary winding; (v) a control circuit configured to generate a control signal to control the power switch; and (vi) an over voltage protection circuit configured to activate a reset signal when the voltage feedback signal is greater than a threshold value, where the reset signal is configured to reset the control signal when activated.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
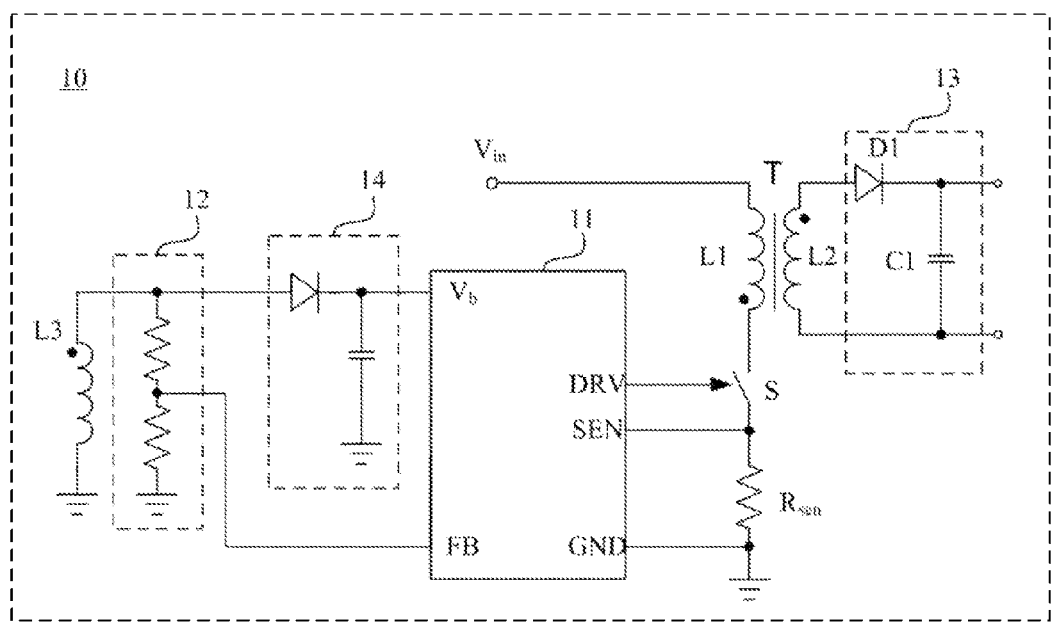
FIG. 1 is a schematic block diagram of an example isolated power converter with an auxiliary winding.

Referring now to FIG. 1, shown is a schematic block diagram of an example isolated power converter with an auxiliary winding. Isolated power converter 10 can include transformer T, power switch S, control circuit 11, voltage feedback circuit 12, secondary rectifier 13, bias voltage generating circuit 14, and current sampling resistor $R_{sen}$. Transformer T can include primary winding L1, secondary winding L2, and auxiliary winding L3. Secondary winding L2 and auxiliary winding L3 can both connect to primary winding L1. Secondary rectifier 13 can connect to secondary winding L2 and may rectify a voltage across secondary winding L2 to output a substantially constant voltage. Secondary rectifier 13 can include diode D1 and capacitor C1. For example, bias voltage generating circuit 14 can connect to auxiliary winding L3 and may rectify a voltage across auxiliary winding L3 to output a substantially constant bias voltage, in order to power control circuit 11.

Control circuit 11 can include bias voltage input terminal $V_b$, sense signal input terminal SEN, feedback voltage input terminal FB, ground terminal GND, and driving signal output terminal DRV. An output terminal of bias voltage generating circuit 14 can connect to bias voltage input terminal $V_b$. Current sampling resistor $R_{sen}$ can sample the current through the power switch to output a voltage signal. Current sampling resistor $R_{sen}$ may have a terminal away from the ground and that can connect to sense signal input terminal SEN of control circuit 11. Voltage feedback circuit 12 can be a voltage dividing resistor loop coupled in parallel with auxiliary winding L3. Voltage feedback circuit 12 can divide a voltage across auxiliary winding L3 into a feedback voltage to be provided to feedback voltage input terminal FB of control circuit 11. For example, control circuit 11 may be an integrated circuit (IC), and other portions of isolated power converter 10 may be implemented in discrete components.

However, the process to make the auxiliary winding is relatively complicated, possibly resulting in higher product costs. In addition, the auxiliary winding typically has a relatively large size, thus consuming a large portion of the area on the circuit board. Although there are some ICs which integrate the bias voltage generating circuit and can power control circuit 11 without using auxiliary winding L3, the auxiliary winding may still be necessary in this approach. This is because the feedback voltage is obtained from the auxiliary winding, in order to generate a control signal for over voltage protection.

In one embodiment, an isolated power converter can include: (i) a transformer having a primary winding and a secondary winding; (ii) a secondary rectifier circuit coupled to the secondary winding; (iii) a power switch coupled between an input voltage source and a first terminal of the primary winding, where a second terminal of the primary winding is coupled to ground; (iv) a feedback circuit coupled between the first and second terminals of the primary winding, the feedback circuit being configured to generate a feedback voltage based on a voltage across the primary winding; (v) a control circuit configured to generate a control signal to control the power switch; and (vi) an over voltage protection circuit configured to activate a reset signal when the voltage feedback signal is greater than a threshold value, where the reset signal can reset the control signal when activated.

Figure 2:
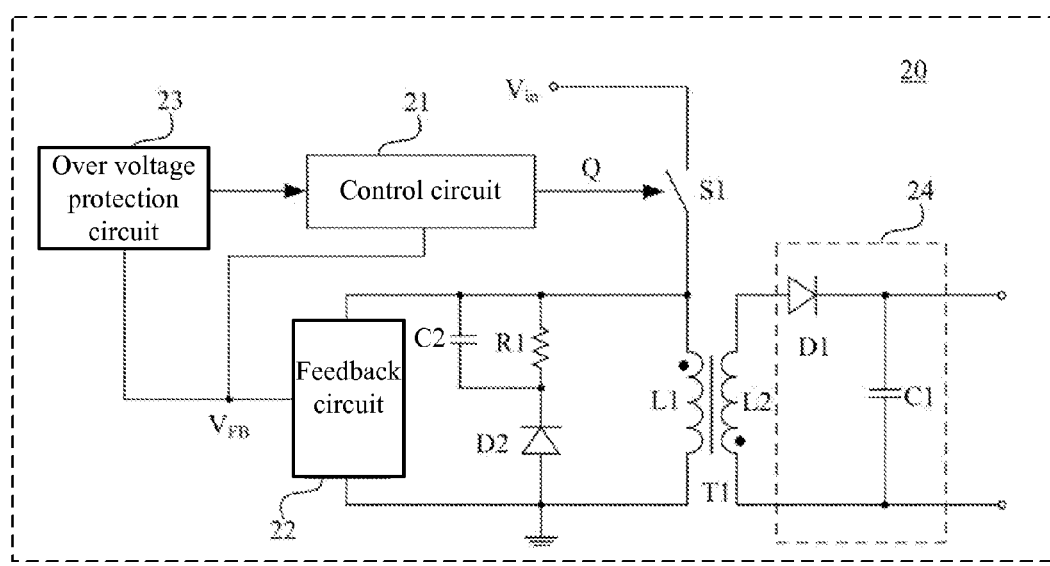
FIG. 2 is a schematic block diagram of a first example isolated power converter, in accordance with embodiments of the present invention.

Referring now to FIG. 2, shown is a schematic block diagram of a first example isolated power converter, in accordance with embodiments of the present invention. In this particular example, isolated power converter 20 can include transformer T1, power switch S1, control circuit 21, feedback circuit 22, over voltage protection circuit 23, and secondary rectifier 24. Transformer T1 can include primary winding L1 and secondary winding L2 coupled with each other, and excluding an auxiliary winding. Also, secondary rectifier 24 can connect to secondary winding L2.

Power switch S1 can connect between input power source and a first terminal of primary winding L1. A second terminal of primary winding L1 can connect to ground. For example, power switch S1 may be any controlled semiconductor switch device, such as a MOSFET device. When power switch S1 is implemented as a MOSFET, a second terminal of power switch S1 coupled with primary winding L1 may be a source of the MOSFET, and a first terminal of power switch S1 coupled with input power source may be a drain of the MOSFET.

Feedback circuit 22 can connect between the first and second terminals of primary winding L1, and can generate feedback voltage $V_{FB}$ in accordance with a voltage across primary winding L1. For example, isolated power converter 20 may also include an RCD snubber connected in parallel with primary winding L1. The RCD snubber (e.g., including diode D2, resistor R1, and capacitor C2) can absorb energy leaked by the leakage inductance of the primary winding, in order to prevent power switch S1 from sustaining a high reverse spike. Diode D2 can connect between the second terminal of primary winding L1 and an intermediate terminal of the RCD snubber. Resistor R1 and capacitor C2 can connect in parallel between the intermediate terminal of the RCD snubber and the first terminal of primary winding L1.

The output terminals of feedback circuit 22 can connect to control circuit 21 and over voltage protection circuit 23, in order to output voltage feedback signal $V_{FB}$ in accordance with the voltage across primary winding L1. Control circuit 21 can generate control signal Q in accordance with voltage feedback signal $V_{FB}$. For example, control signal Q can control (e.g., turn on or off) power switch S1. Also, the "ground" terminal of control circuit 21 can connect to the first terminal of primary winding L1 rather than being directly connected to the common ground.

Over voltage protection circuit 23 can connect to control circuit 21, which can activate a reset signal to reset control circuit 21 when voltage feedback signal $V_{FB}$ is greater than a threshold value (e.g., $V_{th}$). When control circuit 21 is reset, the control signal can turn off power switch S1, and the isolated power converter can effectively be disabled. For example, during normal operation, a parasitic capacitor of power switch S1 may resonant with a leakage inductance of primary winding L1 after power switch S1 is turned off, resulting in oscillation on the voltage across primary winding L1, and leading to variation on voltage feedback signal $V_{FB}$. In order to prevent over voltage protection circuit 23 from operating abnormally due to the variation on voltage feedback signal $V_{FB}$, a time period can be set during which no reset signal may be activated. That is, outside of this predetermined time period, if voltage feedback signal $V_{FB}$ is greater than threshold value $V_{th}$, over voltage protection circuit 23 may activate the reset signal to reset control signal 21. In this way, abnormal operation caused by oscillation on the voltage across primary winding L1 can be substantially avoided.

In this particular example, feedback voltage signal $V_{FB}$ of feedback circuit 22 obtained from the voltage across primary winding L1 may represent the output voltage of the isolated power converter. Similar to the bias voltage generating circuit example described herein, feedback circuit 22 can also be so applied in the isolated power converter of this example. In this case, the positions of power switch S1 and the primary winding may be exchanged, and over voltage protection can be realized based on the voltage across the primary winding. Thus, the auxiliary winding can be excluded from the transformer in order to simplify the manufacturing process, and to lower product costs, as well as to reduce the circuit volume and possibly enhance circuit protection results.

Figure 3:
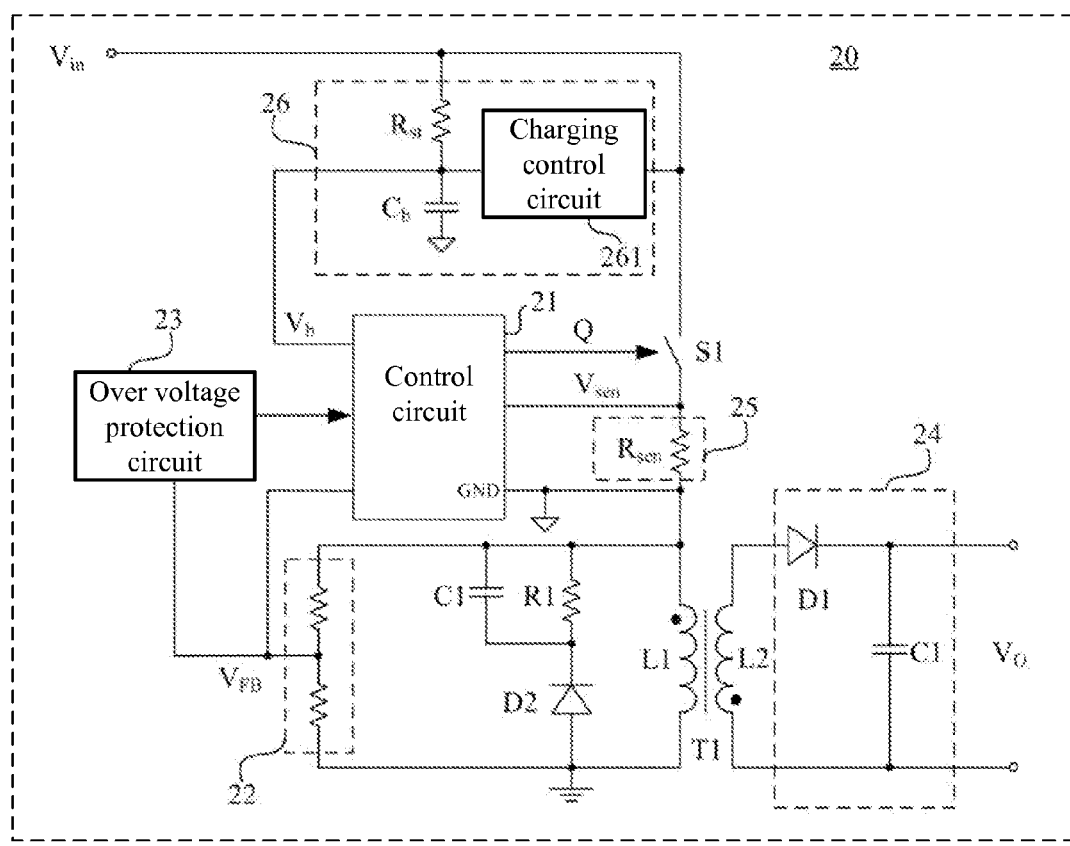
FIG. 3 is a schematic block diagram of a second example isolated power converter, in accordance with embodiments of the present invention.

Referring now to FIG. 3, shown is a schematic block diagram of a second example isolated power converter, in accordance with embodiments of the present invention. In this example, isolated power converter 20 also can include current sampling circuit 25 and bias voltage generating circuit 26. Current sampling circuit 25 can sense the current through power switch S1, or in other words can sense the primary current. For example, current sampling circuit 25 can include current sampling resistor $R_{sen}$. Current sense signal $V_{sen}$ can be generated at a common terminal of current sampling resistor $R_{sen}$ and power switch S1. Those skilled in the art will recognize that current sampling circuit 23 can also be implemented by other current sampling circuitry and/or configurations, such as a current transformer.

In this example, control circuit 21 can include ground terminal GND, which can connect to the first terminal of primary winding L1. The control signal output terminal of control circuit 21 can connect to the control terminal of power switch S1. Control circuit 21 can generate control signal Q according to current sense signal $V_{sen}$ and voltage feedback signal $V_{FB}$. Control signal Q can control (e.g., turn on/off) power switch S1, so as to control the current through the primary winding, and output a substantially constant voltage and/or current in the secondary-side circuit of the isolated power converter.

Bias voltage generating circuit 26 can connect to input voltage source $V_{in}$, and may be used for generating bias voltage $V_b$ to power control circuit 21. For example, bias voltage generating circuit 26 can include bias capacitor $C_b$ and charging control circuit 261 can connect with bias capacitor $C_b$. Bias capacitor $C_b$ can connect between the bias voltage output terminal and the ground terminal of bias voltage generating circuit 26. The "ground" terminal of bias voltage generating circuit 26 can connect to the first terminal of primary winding L1, or in other words to ground terminal GND of control circuit 21 instead of directly to ground directly. Therefore, bias voltage generating circuit 26 may have the same reference potential as control circuit 21, which may be different/isolated from the common ground of the rest of the circuit. Charging control circuit 261 can connect between the bias voltage output terminal and input voltage source $V_{in}$. Charging control circuit 261 can control the bus voltage (e.g., input voltage source $V_{in}$) to charge bias capacitor $C_b$, and bias voltage $V_b$ can be generated at the bias voltage output terminal, in order to power control circuit 21.

Bias voltage generating circuit 26 can connect between input voltage source $V_{in}$ and the first terminal of primary winding L1. Bias voltage $V_b$ can be generated based on a voltage drop on the series connected power switch S1 and current sampling circuit 25. For example, bias voltage generating circuit 26 also can include start resistor $R_{st}$. Bias capacitor $C_b$ can connect to the bus voltage (e.g., input voltage source $V_{in}$) through start resistor $R_{st}$. When control circuit 21 is to be started (e.g., powered-up, enabled, etc.), bias capacitor $C_b$ can be charged by the bus voltage though start resistor $R_{st}$ to obtain bias voltage $V_b$.

The particular bias voltage generating circuit shown in FIG. 3 can generate the bias voltage directly, and without using an auxiliary winding. Thus, this circuitry can be integrated with control circuit 21 to form a common IC with a power supply included. Those skilled in the art will recognize that the bias voltage generating circuit is not limited to above-described circuitry and/or configurations, and any suitable bias voltage generating circuit that can be integrated in a circuit chip and can generate a bias voltage in accordance with the voltage drop across the power switch and current sampling circuit can be utilised in certain embodiments.

By regulating parameters of current sampling circuit 25 and feedback circuit 22, the current sense signal and the voltage feedback signal as input to control circuit 21 may represent the operation status of the isolated power converter. Control circuit 21 can regulate control signal Q according to current sense signal $V_{sen}$ and voltage feedback signal $V_{FB}$, in order to control the output voltage and/or output current of the power stage circuit as substantially constant. Also, control circuit 21, over voltage protection circuit 23, and bias voltage generating circuit 26 can be integrated in a common IC.

Figure 4:
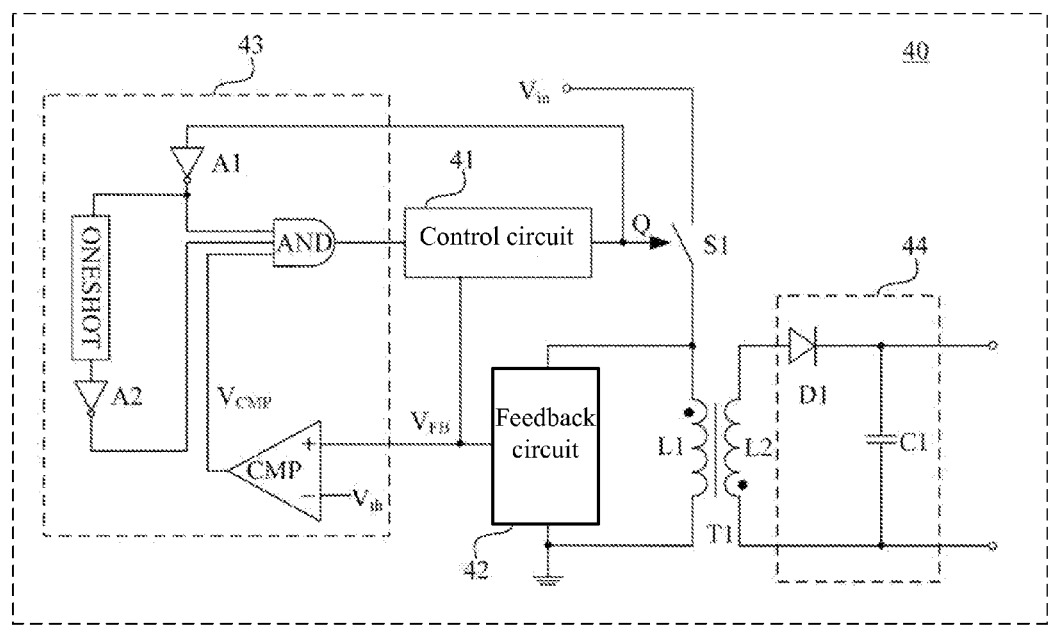
FIG. 4 is a schematic block diagram of a third example isolated power converter, in accordance with embodiments of the present invention.

Referring now to FIG. 4, shown is a schematic block diagram of a third example isolated power converter, in accordance with embodiments of the present invention. In this particular example, isolated power converter 40 can include transformer T1, power switch S1, control circuit 41, feedback circuit 42, over voltage protection circuit 43, and secondary rectifier 44. Transformer T1 can include primary winding L1 and secondary winding L2, and may exclude any auxiliary winding. Also, secondary rectifier 44 can connect to secondary winding L2. Power switch S1 (e.g., a MOSFET device) can connect between input power source and a first terminal of primary winding L1, and a second terminal of primary winding L1 can connect to ground. When power switch S1 is implemented as a MOSFET, a second terminal of power switch S1 connected to primary winding L1 may be a source of the MOSFET, and a first terminal of power switch S1 connected to input power source may be a drain of the MOSFET.

Feedback circuit 42 can connect between the first and second terminals of primary winding L1, and may output feedback voltage $V_{FB}$ in accordance with a voltage across primary winding L1. For example, feedback circuit 42 can be a voltage dividing circuit connected between the first and second terminals of primary winding L1. In this particular example, outside of the predetermined time period, if voltage feedback signal $V_{FB}$ is greater than threshold value $V_{th}$, overvoltage protection circuit 43 can activate a reset signal. Over voltage protection circuit 43 can include comparator CMP for comparing voltage feedback signal $V_{FB}$ against threshold value $V_{th}$. When voltage feedback signal $V_{FB}$ is greater than threshold value $V_{th}$, over voltage signal $V_{CMP}$ can be activated (e.g., go high).

As shown in the example of FIG. 4, the output terminal of feedback circuit 42 can connect to the non-inverting input terminal of comparator CMP, and threshold value $V_{th}$ can be input to the inverting input terminal of comparator CMP. In this way, when voltage feedback signal $V_{FB}$ is greater than threshold value $V_{th}$, comparator CMP may generate a high level as over voltage signal $V_{CMP}$. Those skilled in the art will recognize that the two input terminals can be exchanged based on different signal settings. A logic circuit can be used to generate a reset signal when receiving the over voltage signal outside of predetermined time period/duration $t_{OFF}$, in order to reset control circuit 41. For example, time period $t_{OFF}$ is a predetermined time duration (e.g., from about 10% to about 20% of switching cycle period [T]) after control signal Q is turned off.

In another example, time period $t_{OFF}$ can be a variable time duration that changes along with the present load on the converter, which can be determined by parameters reflecting the load condition. In an example flyback converter, the variable time duration may increase as the load increases. Here, the logic circuit can include single pulse generating circuit "ONESHOT," inverters A1 and A2, and the AND-gate. An input terminal of inverter A1 can receive control signal Q, and an output terminal of inverter A1 can connect to a first input terminal of the AND-gate, and to an input terminal of single pulse generating circuit ONESHOT.

Single pulse generating circuit ONESHOT can connect between an output terminal of inverter A1 and an input terminal of inverter A2. The output terminal of inverter A2 can connect to an input terminal of the AND-gate. The AND-gate can also receive over voltage signal $V_{cmp}$. For example, single pulse generating circuit ONESHOT can generate a single pulse signal with a predetermined pulse width at a rising edge of its input signal. The predetermined pulse width can substantially equal time period $t_{off}$, as described above. In other cases, the blanking time period can be predefined, or can be a variable value changing along with the load on the isolated converter. The AND-gate can generate the reset signal as provided to control circuit 41.

Figure 5:
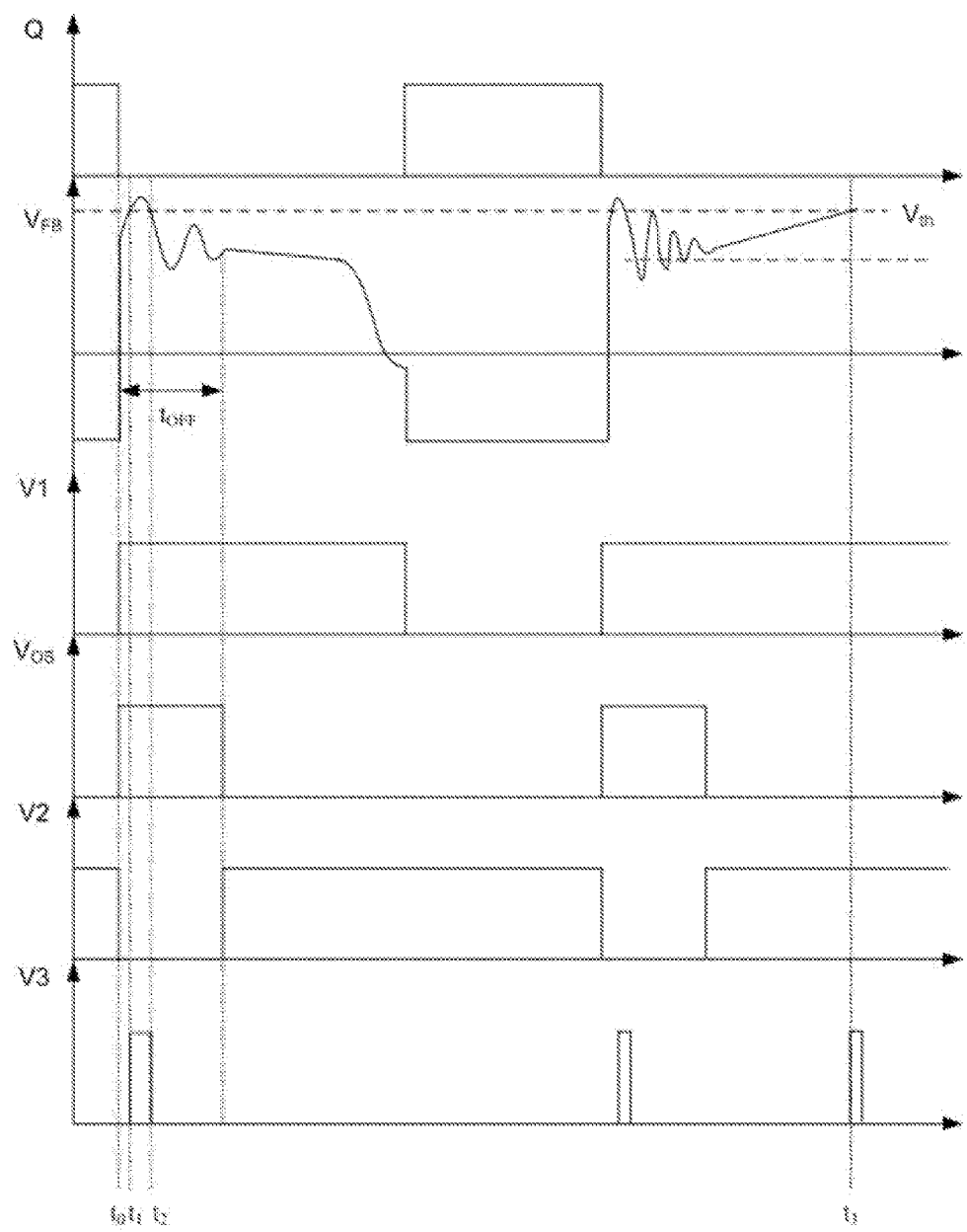
FIG. 5 is a waveform diagram of example operation of the isolated power converter of FIG. 4, in accordance with embodiments of the present invention.

Referring now to FIG. 5, shown is a waveform diagram of example operation of the isolated power converter of FIG. 4, in accordance with embodiments of the present invention. In the example of FIG. 5, control signal Q is a PWM signal with a high level that represents a conduction or on state, and a low level that represents a shutdown or off state. After power switch S1 is shutdown, voltage $V_{L1}$ across primary winding L1 may change to about voltage $V_O*(N_P/N_S)$, which should equal to $V_O*(N_P/N_S)$ under ideal conditions. For example, $V_O$ is an output voltage of the isolated power converter, and $N_P/N_S$ is a turns ratio of the primary winding to the secondary winding.

Therefore, voltage $V_{L1}$ can be used as the voltage feedback signal to represent the output voltage of the isolated power converter. Also, because the parasitic capacitor and the leakage inductance of primary winding L1 may resonant after power switch S1 is turned off (e.g., during time period $t_{OFF}$) oscillation can occur on voltage $V_{L1}$, which may also result in variation on voltage feedback signal $V_{FB}$. If the resonant amplitude is large, voltage feedback signal $V_{FB}$ may be greater than threshold value $V_{th}$. In this case, comparator CMP may generate over voltage signal $V_{CMP}$ to indicate abnormal operation.

As shown in FIG. 4, an inverted version of control signal Q can be input to the AND-gate. The signals V1, V2, and V3 in FIG. 5 correspond to the three input signals to the AND-gate in FIG. 4, where the output of inverter A1 is V1, the output of inverter A2 is V2, and $V_{CMP}$ is V3. Also, when control signal Q goes from high to low, single pulse generating circuit ONESHOT may be triggered to generate pulse signal $V_{OS}$ with a pulse width of $t_{OFF}$. Pulse signal $V_{OS}$ can be converted to signal V2 by inverter A2, and may be input to the AND-gate. The output signal of the AND-gate as provided to control circuit 41 can of course be high when all three input signals V1, V2, and V3 are high, or low otherwise.

As shown in FIG. 5, at time $t_0$, control signal Q goes low, and voltage feedback signal $V_{FB}$ can transition to about $V_O*(N_P/N_S)$, and may begin to resonant. During the time duration from time $t_1$ to time $t_2$, voltage feedback signal $V_{FB}$ can be greater than threshold value $V_{th}$ due to resonant effects, and comparator CMP can activate over voltage signal $V_{CMP}$. However, the output voltage of the isolated converter may not actually go into an over voltage condition in this case. During time period $t_{OFF}$, pulse signal Vos may be high, and inverted signal V2 may be low. Therefore, the signal input to the second input terminal of the AND-gate can be low, and the AND-gate may thus output a low level, which would not activate the reset signal. In this way, abnormal operation can be substantially avoided.

At time $t_3$, voltage feedback signal $V_{FB}$ may be greater than threshold value $V_{th}$ due to the over voltage, and comparator CMP can activate (e.g., bring high) over voltage signal $V_{CMP}$. As time $t_3$ is outside of predetermined time period $t_{OFF}$, pulse signal $V_{OS}$ may be low and V2 can be high. Therefore, the signals input to AND-gate are all at a high level, and the AND-gate can generate a high level at its output as a reset signal to the reset terminal of control circuit 41, in order to reset control circuit 41. Therefore, the over voltage protection circuit in this example can avoid abnormal operation during time period $t_{OFF}$, and may exclude use of an auxiliary winding of the transformer. In this way, the manufacture process can be simplified, circuit volume can be reduced, and circuit protection functionality can be enhanced.

Figure 6:
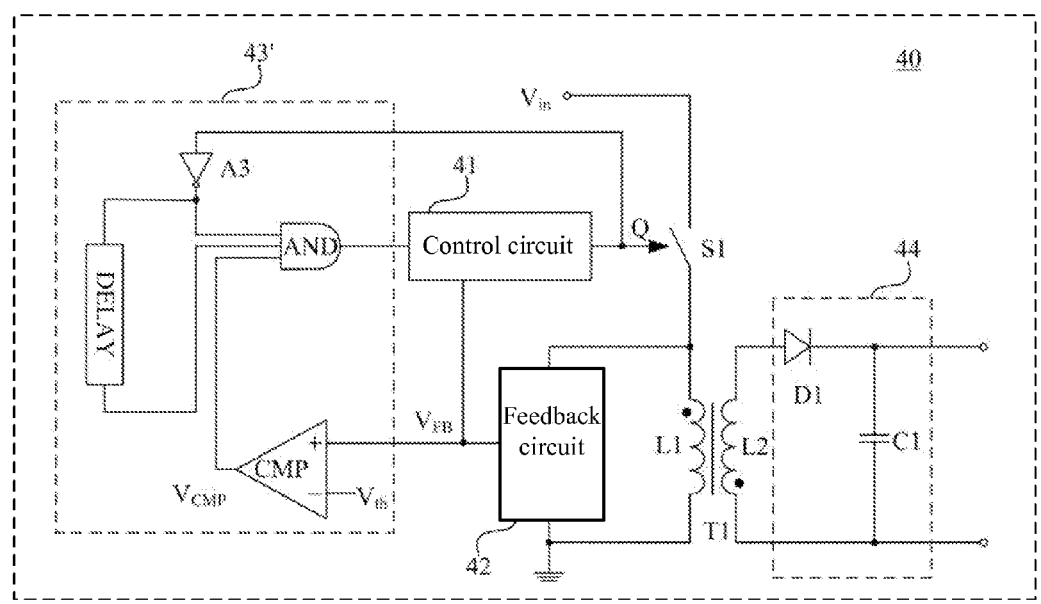
FIG. 6 is a schematic block diagram of a fourth example isolated power converter, in accordance with embodiments of the present invention.

Referring now to FIG. 6, shown is a schematic block diagram of a fourth example isolated power converter, in accordance with embodiments of the present invention. The example isolated power converter of FIG. 6 can include an over voltage protection circuit with a different configuration from that of FIG. 4. In this particular example, outside of the time duration of $t_{OFF}$, if voltage feedback signal $V_{FB}$ is greater than threshold value $V_{th}$, overvoltage protection circuit 43' can activate a reset signal.

Over voltage protection circuit 43' can include comparator CMP, which can compare voltage feedback signal $V_{FB}$ against threshold value $V_{th}$. When voltage feedback signal $V_{FB}$ is greater than threshold value $V_{th}$, over voltage signal $V_{CMP}$ may be activated. The logic circuit in this example can include delay circuit "DELAY," inverter A3, and an AND-gate, as shown. Inverter A3 can receive control signal Q, and may provide an output to a first input terminal of the AND-gate, and to an input terminal of delay circuit DELAY. Delay circuit DELAY can connect between the output of inverter A3 and the second input terminal of the AND-gate. A third input terminal of the AND-gate can receive over voltage signal $V_{CMP}$, and the AND-gate can generate the reset signal. For example, delay circuit DELAY can delay the input signal for a predetermined delay time. The predetermined delay time can substantially equal to time period $t_{OFF}$, as described above. Also, the time period $t_{OFF}$ can be predefined, or may be a variable value that changes along with the load on the isolated converter.

Figure 7:
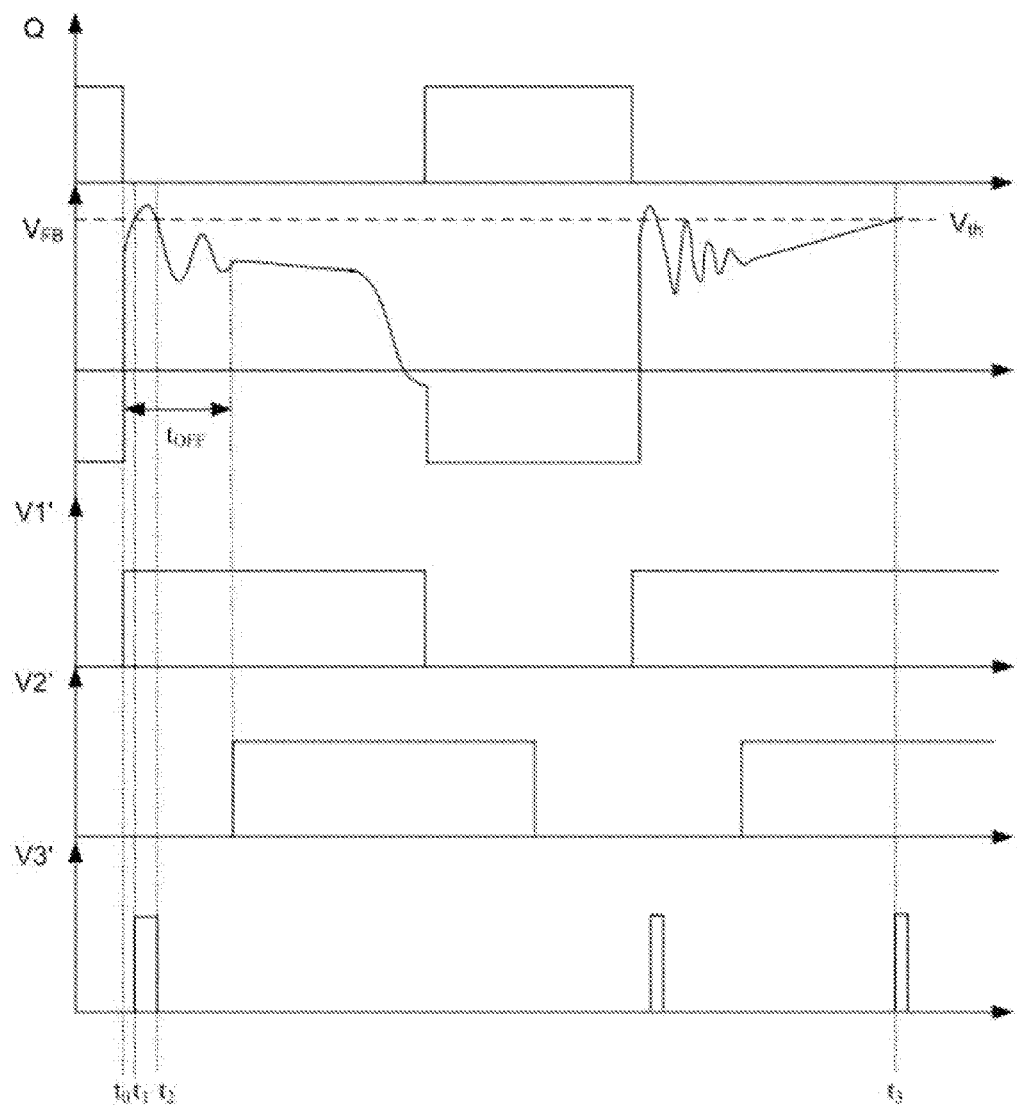
FIG. 7 is a waveform diagram of example operation of the isolated power converter of FIG. 6, in accordance with embodiments of the present invention.

Referring now to FIG. 7, shown is a waveform diagram of example operation of the isolated power converter of FIG. 6, in accordance with embodiments of the present invention. As shown in FIG. 7, the over voltage protection circuit can utilise delay circuit DELAY in order to avoid abnormal operation during the time period $t_{OFF}$. At time $t_0$, control signal Q can go low (e.g., the shutdown state), voltage feedback signal $V_{FB}$ may vary to about $V_O*(N_P/N_S)$, and can then resonant. Signal V1' input to the first input terminal of the AND-gate can go high. Here, the signals V1', V2', and V3' in FIG. 7 correspond to the three input signals to the AND-gate in FIG. 6, where the output of inverter A3 is V1', the output of delay circuit DELAY is V2', and $V_{CMP}$ is V3'.

The inverted version of control signal Q can be delayed by delay circuit DELAY, so the output signal can remain at a low level. During the time period from time $t_1$ to time $t_2$, voltage feedback signal $V_{FB}$ may be greater than threshold value $V_{th}$ due to resonating effects. Comparator CMP can activate (e.g., bring high) over voltage signal $V_{CMP}$. However, during time period $t_{OFF}$, the output signal of delay circuit DELAY may remain low, and as such signal V2' input to the second input terminal of logic circuit AND may remain low. The AND-gate can thus output a low level, which would not activate the reset signal, in order to substantially avoid abnormal operation.

At time $t_3$, voltage feedback signal $V_{FB}$ is greater than threshold value $V_{th}$ due to the over voltage, and comparator CMP can activate (e.g., bring high) over voltage signal $V_{CMP}$. Because time $t_3$ is outside of time period/duration $t_{OFF}$, the output signal of delay circuit DELAY can be at a high level. Therefore, signals input to the three input terminals of the AND-gate may all be at a high level. Thus, the AND-gate output can go high as a reset signal to the reset terminal of control circuit 41, in order to reset control circuit 41 and bring control signal Q low.

Therefore, the over voltage protection circuit in this example can substantially avoid abnormal operation during blanking time period (e.g., $t_{OFF}$), and may exclude an auxiliary winding of the transformer in the circuit implementation. This approach can simplify the manufacturing process, reduce circuit volume, and enhance circuit protection functionality. The examples of FIGS. 4 and 6 can adopt specific logic circuitry to activate (e.g., bring high) a reset signal to control circuit 41 when voltage feedback signal $V_{FB}$ is greater than threshold value $V_{th}$ outside of a time duration $t_{OFF}$.

Figure 8:
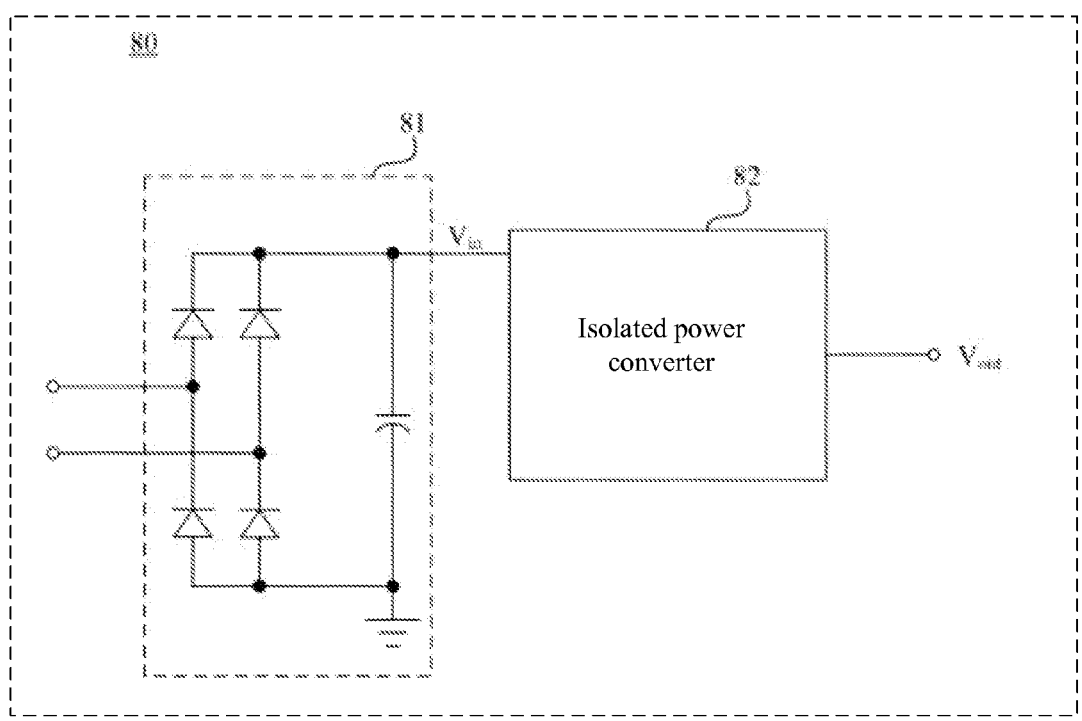
FIG. 8 is a schematic block diagram of an example switching power supply, in accordance with embodiments of the present invention.

Referring now to FIG. 8, shown is a schematic block diagram of an example switching power supply, in accordance with embodiments of the present invention. In this example, switching power supply 80 (e.g., for AC-DC power conversion) can include rectifier bridge 81 and isolated power converter 82. Isolated power converter 82 can include any of the example power converters discussed herein. Also, switching power supply 80 can include an isolated power converter without any auxiliary winding. In this way, a simplified manufacturing process, lower costs, relatively small circuit volume, and enhanced reliability, can be achieved, relative to other approaches.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An isolated power converter, comprising:
    a) a transformer having a primary winding and a secondary winding;
    b) a secondary rectifier circuit coupled to said secondary winding;
    c) a power switch coupled between an input voltage source and a first terminal of said primary winding, wherein a second terminal of said primary winding is coupled to ground;
    d) a feedback circuit coupled between said first and second terminals of said primary winding, and being configured to generate a voltage feedback signal based on a voltage across said primary winding;
    e) a control circuit configured to generate a control signal to control said power switch; and
    f) an over voltage protection circuit comprising a comparator configured to compare said voltage feedback signal against a threshold value, and to activate an over voltage signal when said voltage feedback signal is greater than said threshold value, and a logic circuit configured to activate a reset signal when said over voltage signal is activated outside of a predetermined time period, wherein said reset signal is configured to reset said control signal when activated.

2. The isolated power converter of claim 1, wherein said logic circuit comprises:
    a) a first inverter configured to receive said control signal, and to provide a first inverter output signal;
    b) a single pulse generating circuit configured to provide a pulse signal having a predetermined pulse width in response to a rising edge of said first inverter output signal;
    c) a second inverter configured to receive said pulse signal, and to provide a second inverter output signal; and
    d) an AND-gate configured to receive said over voltage signal, said first inverter output signal, and said second inverter output signal, and to generate said reset signal.

3. The isolated power converter of claim 1, wherein said logic circuit comprises:
    a) an inverter configured to receive said control signal, and to provide an inverter output signal;
    b) a delay circuit configured to delay said inverter output signal by predetermined delay time to provide a delayed signal; and
    c) an AND-gate configured to receive said over voltage signal, said inverter output signal, and said delayed signal, and to generate said reset signal.

4. The isolated power converter of claim 1, wherein said predetermined time period comprises a time duration after said control signal turns off.

5. The isolated power converter of claim 1, wherein said predetermined time period comprises a variable time duration after said control signal turns off, said variable time duration being related to a load on said isolated power converter.

6. The isolated power converter of claim 1, wherein said isolated power converter comprises a current sampling circuit configured to sample a current through said power switch.

7. The isolated power converter of claim 6, wherein said current sampling circuit comprises a current sampling resistor coupled in series to said power switch between said input voltage source and said first terminal of said primary winding.

8. The isolated power converter of claim 1, wherein said isolated power converter comprises a bias voltage generating circuit coupled to said input voltage source to supply a bias voltage for said control circuit.

9. The isolated power converter of claim 1, wherein, said control circuit and said over voltage protection circuit are integrated in a single integrated circuit (IC).

10. A switching power supply, comprising a rectifier bridge coupled to the isolated power converter of claim 1.

* * * * *